United States Patent Office 3,137,674
Patented June 16, 1964

3,137,674
POLYETHYLENE MODIFIED WITH A VINYL COMPOUND
Nelson S. Marans, Adelphi, and William D. Addy, Baltimore, Md., assignors to W. R. Grace & Co., New York, N.Y., a corporation of Connecticut
No Drawing. Filed Dec. 9, 1960, Ser. No. 74,758
12 Claims. (Cl. 260—45.5)

This invention relates to a novel process for modifying polymers. More particularly this invention is directed to modifying polyolefins to increase their strength and rigidity at temperatures above the crystalline melting point.

Polymers of ethylene such as those described in U.S. 2,153,553 and in U.S. 2,816,883 are well known in the art today and are generally characterized by their organic solvent solubility and their thermoplastic properties. Recently, several methods have been tried with varying success to decrease the thermoplasticity and solubility by modifying the polymer. One well known method of modification is to crosslink the polymer by blending free radical precursors, e.g. organic peroxides and bisperoxides into the polymer and thereafter curing the polymer at elevated temperatures. Another method of modification is to subject the polymer to the impingement of high energy particle or corpuscular irradiation to attain a crosslinked polymer. Yet another method of modification recently reported is the subjection of polyolefins and especially polyethylene to irradiation in the presence of certain monomers, e.g. acrylonitrile to form graft polymers.

The aforesaid modification methods, however, all have certain drawbacks which detract from their commercial acceptability. For example, polyethylene crosslinking with organic peroxides usually precludes crosslinking a preformed article uniformly. Irradiation of polyethylene and especially high density polyethylene with high energy particles, e.g. electrons, requires high dosages, i.e. 10–20 megarads to obtain sufficient crosslinking for most purposes. Such dosages of irradiation are expensive. Irradiation of polyethylene in the presence of another monomer to form a uniformly grafted polymer requires either prior incorporation of the monomer at high concentrations in polyethylene or a low radiation dose rate to permit monomer diffusion into the polyethylene during irradiation. In the former case, i.e. prior incorporation of the monomer at high concentrations, the uniform blending is difficult at ordinary temperatures for most monomers in a crystalline polyolefin. In the latter case, i.e. using a low radiation dose rate the dwell time in the radiation field is necessarily increased thus rendering the process economically unattractive. The use of a high dose rate without prior incorporation of the monomer yields large quantities of homopolymer and mainly surface grafting. This would be both costly and produce an unsatisfactory material.

In accord with the present invention it has been found that modification of polyolefins to increase strength and rigidity at temperatures above the polymers crystalline melting point can be accomplished most efficiently by irradiating the polymer in the presence of an allylic ester of a polybasic acid and thereafter subjecting the thus-irradiated polymer to grafting in the presence of a monomeric vinyl compound selected from the group consisting of vinyl acetate, N-vinyl-2-pyrrolidone, 2-vinylpyridine, ethyl methacrylate, methyl acrylate and ethyl acrylate at temperatures below the crystalline melting point of the polymer. Not only are the high temperature properties improved, but room temperature physical properties such as dyeability, permeability, elongation, etc. are favorably changed.

Although the irradiation step is operable in air it is preferably carried out in an inert atmosphere, e.g. nitrogen or the noble gases. This increases the efficiency of the system by excluding oxygen and other contaminants which decrease the number of useable trapped free radicals in the polymer.

The irradiation step is preferably performed at room temperature.

The allylic compounds in the instant invention are efficient free radical producers. This is due to the lower amount of energy required to abstract hydrogen from the allylic position. Thus a higher free radical yield/unit irradiation dose is obtained by imbibing the polyolefin in the allylic compound prior to performing the irradiation step. Additionally, the allylic compounds disclosed herein form polymers of short chain length due to chain transfer. By chain transfer is meant the interaction of the free radical at the end of a growing chain with a monomer or polymer molecule whereby a hydrogen is abstracted from the latter and the free radical character is transferred from the growing chain to the monomer or polymer. Such a process can occur between (1) growing chains and (2) molecules of the monomer or the already formed graft polymer. Hence, with allylic compounds containing at least two allylic groups it is possible to obtain more crosslinking per unit monomer because it is possible to form a crosslink with grafted polymer without destroying the free radical. To put it another way, for a given number of radicals present in the irradiated system, the presence of an allylic compound containing at least 2 allylic groups increases crosslinking by the normal branching reaction of such a monomer. A branching monomer is then one which has at least two unsaturations present in the monomer.

One class of allylic compounds operable in this invention is allylic esters of polybasic acids. Examples of said class would include diallyl phthalate, triallyl citrate, triallyl cyanurate, di- and triallyl esters of dibasic and tribasic aliphatic acids and diallyl and triallyl esters of dibasic and tribasic aromatic acids.

Monomers operable in the grafting step include, but are not limited to, vinyl acetate, ethyl methacrylate, ethyl acrylate, methyl acrylate, N-vinyl-2-pyrrolidone, and 2-vinylpyridine. Monomers which polymerize and terminate by coupling as opposed to termination by disproportionation are preferred as a graft in this invention.

The theory of the mechanism for increased crosslinking by the use of monomer grafting is a matter of conjecture. However, a possible path for this improved crosslinking follows. At the end of the irradiation of the mixture of the allylic ester and polyethylene, trapped free radicals are left in the system. On standing in air these radicals would react with oxygen and the major long term occurrence would be either polymer scission or inefficient use of these radicals to give crosslinking. If instead the irradiated samples are heated immediately to above the melting point of the crystalline polyethylene, sample deformation may occur and also some of the radicals formed may give chain scission. On the other hand, our system of heating in the presence of a monomer that terminates polymerization by crosslinking would give improved crosslinking efficiency by either or both of the following mechanisms. (1) The monomer reacts with the major portion of radicals left in the irradiated polymer and the graft grows until a crosslink is formed with another graft. (2) The monomer may react with a radical that would normally give chain scission and this graft reacts with another graft to give coupling. By this method, the net crosslinking is increased because of repression of the chain scission reaction.

Thus, both the presence of the di or tri allyl ester during the irradiation and the use of the monomer after irradiation increases the crosslinking efficiency.

The amount of monomer grafted onto the polymer in the instant invention is dependent upon various factors, one of which is the number of trapped free radicals in the irradiated polymer. Since the polymerization of the monomers disclosed herein terminate biradically, the percent monomer grafted is approximately proportional to the irradiation dosage to the one-half power. Thus, the percent of grafted monomer is about 1 to 100% by weight of the polyolefin under ordinary operating conditions in the instant invention. However, it should be noted that certain monomers, e.g. 2-vinylpyridine are capable of grafting onto the irraditaed polyolefin at dosages disclosed herein to the extent of 200% by weight of the irradiated polyolefin.

The polyolefin to be irradiated can be in various forms. Preferably, the polymer is present in the form of sheeting, film, or wire coating. It is even possible to use the polymer in particulate or powder form but special procedures must be followed to thereafter shape the grafted polymer.

The grafting step is performed at temperatures below the crystalline melting point of the polymer. Grafting is ordinarily performed at temperatures ranging from room temperature up to the melting point of the polymer, however, even lower temperatures are operable, if a reasonable monomer diffusion rate into the substrate polymer is realized.

The stepwise performance, i.e. irradiation followed by grafting is necessary to obtain the high percent graft without homopolymerization of the non-allylic monomer. By carrying out the procedure in steps, it is possible to employ relatively high irradiation dose rates over a short period without fear of homopolymerization of the non-allylic monomer to be grafted. Thus, the system is only dosage dependent which is more economical and not dose rate dependent.

The irradiation dosage used in the practice of this invention can vary between wide limits. Dosages of 0.1 to 100 megarads or more are operable. Preferably, dosages of 0.5 to 6 megarads are employed. Such preferred dosages when used to crosslink high density polyethylene are well below those necessary, i.e. 10-20 megarads to obtain the same amount of crosslinking in high density polyethylene per se.

Irradiation employing particles in the instant invention includes the use of positive ions (e.g., protons, alpha particles and deuterons), electrons and neutrons. Although the examples herein used a Van de Graaff electron accelerator as the irradiation source, it should be understood that the present invention is not limited thereto. The charged particles may be accelerated to high speeds by means of various voltage gradient mechanisms such as a cyclotron, a Cockroft Walton accelerator, a resonant cavity accelerator, a betatron, a GE resonant transformer, a synchroton, or the like. Furthermore, particles irradiation may also be supplied from radioactive isotopes or an atomic pile.

The duration of the imbibing step with the allylic compounds is dependent upon the thickness of the polymer substrate. It has been found that for a high density polyethylene substrate in the form of sheeting having a thickness of 30 mils, an imbibing time of 2 hours is sufficient. Thus, for thin films, i.e., 0.5 mil thickness, an imbibing time of 5 minutes or less is operable. Even longer imbibing periods can be employed but are unnecessary. To insure diffusion of the allylic compounds into the polymer substrate in the imbibing step, a polymer solvent which readily swells the polymer may be employed. In the examples herein benzene was used. However, other solvents are operable and are well known to those skilled in the art.

The irradiation dosage employed can be imparted to the polymer substrate in a single pass. In the examples herein, a single pass is of 3 second duration under the beam.

The duration of the grafting step is dependent upon the thickness of the polymer substrate. In the examples herein wherein the polymer substrate was in the form of 30 mil sheeting the duration of the grafting step was 2 hours. Obviously for thinner films, shorter periods can be employed.

The polymer substrate used herein was a commercial polyethylene containing an antioxidant. Such a polymer is operable in this invention but it should be remembered that the presence of large amounts of antioxidant may decrease the number of trapped free radicals which may be formed for crosslinking and/or grafting. The allylic compounds and the grafted monomers also contain antioxidants which may decrease the percentage of monomer grafted.

Throughout the invention the melt indices were measured under the conditions specified in ASTMD 1238-52T. The elastic modulus was measured as follows: The apparatus for elastic modulus measurements consists of (1) a one later flask equipped with a 24/40 ground glass joint and heated by a mantle, (2) an air-jacketed column, 3 feet long equipped with a 24/40 ground glass joint at the bottom and top. Within the outside air jacket is a second jacket which contains the refluxing vapor from the heated flask. Within this second jacket is the sample holder section containing an inlet for nitrogen, and (3) a large condenser having a 24/40 joint connected to the air-jacketed column.

The compound used to maintain constant temperature in the column varies according to the crystalline melting point of the polymer being tested. For high density polyethylene, chlorotoluene (B.P. 159-162° C.), has been used.

The polymer sample for elastic modulus is cut to approximately the following dimensions, 0.25 inch wide, 3.5-4.0 inches long and approximately 0.030 inches thick. Both the thickness and width are measured as accurately as possible with a micrometer caliper. Two points are inked on the polymer sample about 1.5-2.0 inches apart and the sample suspended from an upper clamp. To the lower end is attached a small wire loop, and to the loop a string which reaches below the air-jacketed column. Incremental weights are formed from wire and may be loaded or unloaded from the string at will. The sample is equilibrated for 15 minutes before loading with equilibration indicated by the polymer sample becoming more transparent. The length between points is then determined by a traveling cathetometer, accurate to 0.001 inch. After this equilibration at essentially no load the polymer sample is sufficiently loaded to give about 10-50% elongation and then the loaded sample is allowed to equilibrate for 15 minutes. After the length of the loaded sample is measured, the sample is unloaded and allowed to equilibrate for 30 minutes and then the length measured. Incremental weights are then loaded on the sample at five minute intervals and the lengths are measured for each load. The elastic modulus is then readily calculated by the following series of steps: (a) the length with no load is obtained by plotting the length of the polymer sample vs. the loading weight and extrapolating to zero load (b) the loading in grams is plotted against $$\alpha - \frac{1}{\alpha^2}$$

where $\alpha$ is the ratio of loaded length to unloaded length, and the slope then is $$\frac{df}{d\left(\alpha - \frac{1}{\alpha^2}\right)}$$

(c) The area, A, supporting the weight is the product of the width and the thickness, both in centimeters. The final value of elastic modulus, E, may then be obtained in dynes/cm.² using the following equation:

$$E = \frac{981}{A} d \frac{df}{\left(\alpha - \frac{1}{\alpha^2}\right)}$$

The elastic modulus, obtained above the crystalline melting point of the polymer, gives an indication of the density of crosslinking. The elastic modulus is approximately proportional to the number of crosslinks formed in the system but maximum deviation from this relationship occurs both at low crosslinking and high crosslinking densities. At low crosslinking density a number of crosslinks must be formed before the polymer becomes thermoset. At high crosslinking density the formed crosslinks yield sufficient entanglements to give erroneously high values for crosslinking. Despite this deviation, over a wide range of elastic modulus, the density of crosslinking is proportional to the elastic modulus.

EXAMPLE 1

*Imbibing Process*

Commercial polyethylene having a melt index of 0.52, $\eta sp/c$ of 2.7 and a density of 0.96 was cut into strips (5" x 0.25" x 30 mils). Three 500 ml. 3 neck flasks equipped with stirrers and condensers were charged with 250 ml. of a 30% allylic compound-containing benzene solution as follows: Flask A—250 ml. of a benzene solution containing 30% diallyl phthalate by weight; Flask B—250 ml. of a benzene solution containing 30% triallyl citrate by weight, and Flask C—250 ml. of a benzene solution containing 30% triallyl cyanurate by weight. A polyethylene strip was added to each of the aforesaid flasks and agitated therein for 2 hours at 70° C. The strips were removed from the flasks and dried in air for 24 hours to evaporate the benzene. The strips were then weighed to determine percent imbibition. The weight percent diallyl phthalate imbibed in the polyethylene strip in Flask A was equal to 2.8%. The weight percent triallyl citrate imbibed in the polyethylene strip in Flask B was equal to 3.4% and the weight percent trially cyanurate imbibed in the strip in Flask C was 4.5%.

The imbibed strips were placed in separate glass tubes and the tubes evacuated to 0.3 mm. Hg pressure in a Dry Ice-acetone bath prior to sealing.

EXAMPLE 2

*Irradiation*

The imbibed polyethylene strips in sealed glass tubes from Example 1 were subjected to irradiation from a Van de Graaff electron accelerator. The dosage, i.e. 1.5 megarads was applied in a single 3 second pass under the Van de Graaff electron accelerator at a beam current of 195 microamperes and a voltage of 2 million volts. The thus irradiated polyethylene strips were treated as described in the following example.

EXAMPLE 3

*Grafting*

The tubes containing the irradiated polyethylene strips from Example 2 were each opened and sufficient methyl acrylate added to cover the strips. The tubes were then evacuated in a Dry Ice-acetone bath to 0.3 mm. Hg pressure and sealed. The tubes contents were heated for 2 hours at 70° C. to accomplish grafting. The tubes were broken and the polyethylene strips washed in benzene followed by an acetone wash. The strips were then air dried to constant weight.

The samples were weighed to determine percent graft and characterized for elastic modulus by the method related supra. The results are reported in Table I.

TABLE 1

| Run No. | Imbibing Compound | Grafting Compound | Percent Graft [1] | Elastic Modulus (dynes/cm²) |
|---|---|---|---|---|
| 1 | Diallyl phthalate | Methyl acrylate | 41 | 8.5×10⁵ |
| 2 | Triallyl citrate | do | 57 | 3.2×10⁵ |
| 3 | Triallyl cyanurate | do | 50.7 | 2.9×10⁵ |

[1] Based on weight of irradiated polyethylene composition.

Thus, in Run No. 1 a crosslinked composition consisting essentially of 69% polyethylene, 29% methyl acrylate and 2% diallyl phthalate by weight of said composition was obtained.

In Run No. 2 a crosslinked composition consisting essentially of 61.5% polyethylene, 36.3% methyl acrylate and 2.2% triallyl citrate by weight of said composition was obtained.

In Run No. 3 a crosslinked composition consisting essentially of 63.4% polyethylene, 33.6% methyl acrylate and 3.0% triallyl cyanurate by weight of said composition was obtained.

To show the improvement in percent graft and elastic modulus obtained by the practice of the instant invention over various grafting methods, the following runs were made.

EXAMPLE 4

Commercial polyethylene having a melt index of 0.52 and a density of 0.96 was cut into strips (5" x 0.25" x 30 mils) and imbibed in the various allylic compounds as in Example 1. The imbibed samples were irradiated according to the procedure in Example 2. The irradiated polyethylene strips were each resealed with a methyl acrylate solution containing 30% by weight of the same allylic compound in which the strips had been imbibed prior to irradiation. The tubes were evacuated to 0.3 mm. Hg pressure, sealed and heated for 2 hours at 70° C. The polyethylene strips were removed from the tubes and washed in benzene and acetone sequentially.

The grafted strips were weighed to determine percent graft and characterized for elastic modulus. The results are reported in Table 2.

TABLE 2

| Run No. | Imbibing Compounds | Grafting Compound | Percent Graft | Elastic Modulus (dynes/cm.²) |
|---|---|---|---|---|
| 4 | Diallyl phthalate | Methyl acrylate containing 30% diallyl phthalate. | 7.6 | 0.5×10⁵ |
| 5 | Triallyl citrate | Methyl acrylate containing 30% triallyl citrate. | 8.8 | 0.9×10⁵ |
| 6 | Triallyl cyanurate | Methyl acrylate containing 30% triallyl cyanurate. | 11.0 | 1.0×10⁵ |

A comparison of runs in Table 1 and Table 2 show that the addition of the allylic imbibing compound to the grafting step decreases the percent graft and elastic modulus considerably, as compared to the instant invention.

EXAMPLE 5

Commercial polyethylene having a melt index of 0.52 and a density of 0.96 was cut into 3 strips (5" x 0.25" x 30 mils) and placed in separate glass tubes. The tubes were evacuated to 0.3 mm. Hg pressure and sealed. The sealed tubes each containing a polyethylene strip were subjected to an irradiation dosage of 1.5 megarads in a single 3 second pass under a Van de Graaff electron accelerator. The tubes were opened and sufficient methyl acrylate solution containing 30% by weight of an allylic compound was added to cover the irradiated polyethylene strips. The tubes were reevacuated to 0.3 mm. Hg pressure and resealed prior to heating at 70° C. for 2 hours. The strips were removed from the tubes and washed in benzene followed by an acetone wash. The percent graft and elastic modulus for these runs are reported in Table 3.

TABLE 3

| Run No. | Grafting Compound | Percent Graft | Elastic Modulus (dynes/cm²) |
|---|---|---|---|
| 7 | Methyl acrylate containing 30% diallyl phthalate. | 7.7 | 1.0×10⁵ |
| 8 | Methyl acrylate containing 30% triallyl citrate. | 14.0 | 1.6×10⁵ |
| 9 | Methyl acrylate containing 30% triallyl cyanurate. | 9.0 | 0.7×10⁵ |

Comparing Table 3 with Table 1 shows that adding the allylic compound and the grafted monomer to the system after irradiation without imbibing in the allylic compound prior to irradiation fails to yield the high percent graft and high elastic modulus obtained by this invention.

EXAMPLE 6

Commercial polyethylene having a melt index of 0.52, $\eta sp/c$ of 2.7 and a density of 0.96 was cut into a strip (5" x 0.25" x 30 mils). The strip was placed in a glass tube and the tube evacuated to 0.3 mm. Hg pressure prior to sealing. The sealed tube was then subjected to an irradiation dosage of 1.5 megarads applied in a single 3 second pass under a Van de Graaff electron accelerator at a beam current of 195 microamperes and a voltage of 2 million volts. The tube was opened and sufficient methyl acrylate added to cover the strip. The tube was evacuated to 0.3 mm. Hg pressure and resealed. After heating the tube for 2 hours at 70° C. the tube was opened and the polymer strip washed in benzene and acetone followed by drying to a constant weight. The percent graft and elastic modulus characterization is reported in Table 4.

TABLE 4

| Run No. | Imbibing Compound | Grafting Compound | Percent Graft | Elastic Modulus (dynes/cm.²) |
|---|---|---|---|---|
| 10 | None | Methyl acrylate | 9.8 | 1.3×10⁵ |

The comparison of Table 4 and Table 1 shows an increased percent graft and elastic modulus is obtained when the polymer is imbibed in an allylic compound prior to irradiation in accordance with the practice of this invention.

EXAMPLE 7

Commercial polyethylene having a melt index of 0.52 and an $\eta sp/c$ of 2.7 and a density of 0.96 was cut into strips (5" x 0.25" x 30 mils) and was imbibed in the various allylic compounds employed in Example 1. The imbibed polyethylene strips were then irradiated as in Example 2.

The irradiated polyethylene strips were then resealed in separate glass tubes containing sufficient benzene to cover the strips. The tubes were then evacuated to 0.3 mm. Hg pressure prior to sealing. After heating for 2 hours at 70° C. in an effort to permit the trapped radicals to couple to give crosslinks the tubes were opened and the polyethylene strips washed in benzene followed by an acetone wash. The elastic modulus for these runs is reported in Table 5.

TABLE 5

| Run No. | Imbibing Compound | Grafting Compound | Elastic Modulus (dynes/cm.²) |
|---|---|---|---|
| 11 | Diallyl phthalate | None | 0.0×10⁵ |
| 12 | Triallyl citrate | do | 0.8×10⁵ |
| 13 | Triallyl cyanurate | do | 0.0×10⁵ |

The results in Table 5 as compared to Table 1 show that both the imbibing and later grafting step are required to give a substantial increase in crosslinking.

In practicing this invention, it has been found that at least 1% of an allylic ester of a polybasic acid, e.g. diallyl phthalate based on the weight of the polyethylene treated is necessarily imbibed into polyethylene in order to obtain the increased percent graft and elastic modulus. Lower amounts are operable but do not yield sufficient improvement in crosslinking to warrant its use. The amount of the allylic ester of a polybasic acid imbibed is preferably in the range 1–20% based on the weight of the polyethylene treated. Even greater amounts can be imbibed if a solvent having greatly enhanced swelling power on the polyethylene is employed as a vehicle for the allylic ester of a polybasic acid. Operable solvents for the allylic compounds are those which have a swelling effect on the polymer at temperatures below its melting point and accept the allylic compounds in solution. Examples of such solvents include, but are not limited to, carbon tetrachloride, benzene, cyclohexane, toluene and the like. Thus, the amount of allylic compound imbibed into the polymer is dependent on the solvent employed and the imbibing temperature below the melting point of the polymer. All else being equal, the higher the imbibing temperature, below the melting point of the polymer, the greater the amount of the allylic compound imbibed.

This invention is operable with both high density, e.g. 0.94–0.97 and low density, e.g. 0.91–0.93 polyethylene. In using low density polyethylene it should be remembered that as compared to high density material under the same conditions, more of the allylic compound will be imbibed but grafting is not as efficient due to the reduced stability of the trapped free radical in low density polyethylene.

In practicing this invention and particularly when using low density polyethylene care must be exercised that the imbibing step is not performed above the temperature of solution of the polyethylene in the particular solvent for the allylic compound. Such temperatures are readily ascertainable for the various allylic compound solvents by one skilled in the art.

The grafting step in this invention is preferably, but not necessarily, performed in an inert atmosphere to insure maximum utilization of the trapped free radicals.

The grafted polymers of the instant invention have improved dyeability and increased elongation. The grafted polymers herein can be used as wire coating, heat shrinkable film, and the like.

We claim:

1. The process of modifying polyethylene which comprises in an inert atmosphere irradiating with high energy ionizing particle radiation polyethylene to form trapped free radicals therein in the presence of a compound containing at least two allylic groups and thereafter subjecting the thus-irradiated polymer to grafting by heating the thus irradiated polymer in the presence of a monomeric vinyl compound selected from the group consisting of vinyl acetate, N-vinyl-2-pyrrolidone, 2-vinylpyridine, ethyl methacrylate, methyl acrylate and ethyl acrylate at temperatures below the crystalline melting point of the polymer.

2. The process for modifying polyethylene which comprises in an inert atmosphere irradiating with high energy ionizing particle radiation polyethylene to form trapped free radicals therein in the presence of an allylic ester of a polybasic organic acid and thereafter subjecting the thus-irradiated polymer to grafting by heating the thus irradiated polymer in the presence of a monomeric vinyl compound selected from the group consisting of vinyl acetate, N-vinyl-2-pyrrolidone, 2-vinyl pyridine, ethyl methacrylate, methyl acrylate, and ethyl acrylate at temperatures below the crystalline melting point of said polyethylene.

3. The process according to claim 2 wherein the allylic ester of the polybasic organic acid is diallyl phthalate.

4. The process according to claim 2 wherein the allylic ester of the polybasic acid is triallyl citrate.

5. The process according to claim 2 wherein the allylic ester of the polybasic acid is triallyl cyanurate.

6. The process according to claim 2 wherein the irradiation dosage is in the range of 0.1–100 megarads.

7. The process according to claim 2 wherein the irradiation dosage is in the range 0.5 to 6.0 megarads.

8. The process according to claim 2 wherein the allylic ester of a polybasic organic acid is dissolved in a solvent.

9. The process according to claim 8 wherein the solvent is a member of the group consisting of benzene, toluene, carbon tetrachloride and cyclohexane.

10. The process of modifying polyethylene which comprises imbibing diallyl phthalate into polyethylene, subjecting the thus treated polyethylene to irradiation with high energy ionizing particle radiation to form trapped free radicals therein in an inert atmosphere and thereafter heating the thus irradiated polyethylene at a temperature of about 70° C. in the presence of methyl acrylate.

11. The process of modifying polyethylene which comprises imbibing triallyl citrate into polyethylene, subjecting the thus treated polyethylene to irradiation with high energy ionizing particle radiation to form trapped free radicals therein in an inert atmosphere and thereafter heating the thus irradiated polyethylene at a temperature of about 70° C. in the presence of methyl acrylate.

12. The process of modifying polyethylene which comprises imbibing triallyl cyanurate into polyethylene, subjecting the thus-treated polyethylene to irradiation with high energy ionizing particle radiation to form trapped free radicals therein in an inert atmosphere and thereafter heating the thus irradiated polyethylene at a temperature of about 70° C. in the presence of methyl acrylate.

References Cited in the file of this patent

UNITED STATES PATENTS

| | | |
|---|---|---|
| 2,907,675 | Gaylord | Oct. 6, 1959 |
| 3,008,885 | Talet | Nov. 14, 1961 |
| 3,008,920 | Urchick | Nov. 14, 1961 |

FOREIGN PATENTS

| | | |
|---|---|---|
| 820,120 | Great Britain | Sept. 16, 1959 |